(12) United States Patent
Myers et al.

(10) Patent No.: US 10,831,384 B2
(45) Date of Patent: Nov. 10, 2020

(54) MEMORY DEVICE WITH POWER MANAGEMENT

(71) Applicant: Micron Technology, Inc., Boise, ID (US)

(72) Inventors: Brock Myers, Longmont, CO (US); Carl Mies, Federick, CO (US)

(73) Assignee: Micron Technology, Inc., Boise, ID (US)

( * ) Notice: Subject to any disclaimer, the term of this patent is extended or adjusted under 35 U.S.C. 154(b) by 145 days.

(21) Appl. No.: 15/692,553

(22) Filed: Aug. 31, 2017

(65) Prior Publication Data
US 2019/0065089 A1  Feb. 28, 2019

(51) Int. Cl.
*G06F 3/06* (2006.01)
*G06F 1/3225* (2019.01)

(52) U.S. Cl.
CPC .......... *G06F 3/0625* (2013.01); *G06F 1/3225* (2013.01); *G06F 3/0659* (2013.01); *G06F 3/0679* (2013.01); *G06F 3/0688* (2013.01)

(58) Field of Classification Search
CPC ..... G06F 3/0625; G06F 3/0659; G06F 3/0688
See application file for complete search history.

(56) References Cited

U.S. PATENT DOCUMENTS

| | | | |
|---|---|---|---|
| 7,127,573 B1* | 10/2006 | Strongin | G06F 1/3203 711/158 |
| 7,412,614 B2* | 8/2008 | Ku | G06F 1/206 365/211 |
| 2007/0011421 A1 | 1/2007 | Keller et al. | |
| 2007/0220293 A1 | 9/2007 | Takase | |
| 2007/0288783 A1 | 12/2007 | Ogasawara et al. | |
| 2008/0040563 A1 | 2/2008 | Brittain et al. | |
| 2008/0059822 A1* | 3/2008 | Choi | G06F 1/3203 713/320 |
| 2008/0168287 A1 | 7/2008 | Berry et al. | |
| 2013/0290611 A1* | 10/2013 | Biederman | G11C 16/30 711/103 |
| 2016/0077961 A1* | 3/2016 | Erez | G06F 3/0625 711/103 |
| 2017/0269669 A1* | 9/2017 | Choi | G11C 5/14 |

OTHER PUBLICATIONS

International Application No. PCT/US2018/046766—International Search Report and Written Opinion, dated Nov. 28, 2018, 11 pages.

* cited by examiner

*Primary Examiner* — Jaweed A Abbaszadeh
*Assistant Examiner* — Gayathri Sampath
(74) *Attorney, Agent, or Firm* — Perkins Coie LLP

(57) ABSTRACT

A memory device includes a memory array including a plurality of memory components; and a controller coupled to the memory array, the controller configured to: determine a set of transactions to be implemented across two or more memory components according to an initial schedule; calculate a first plurality of power consumption levels corresponding to the initial schedule; and if one or more of the power consumption levels exceed a predetermined threshold, calculate an updated schedule for implementing the set of transactions across the two or more memory components, wherein the updated schedule corresponds to a second plurality of power consumption levels that are all at or below the predetermined threshold.

22 Claims, 5 Drawing Sheets

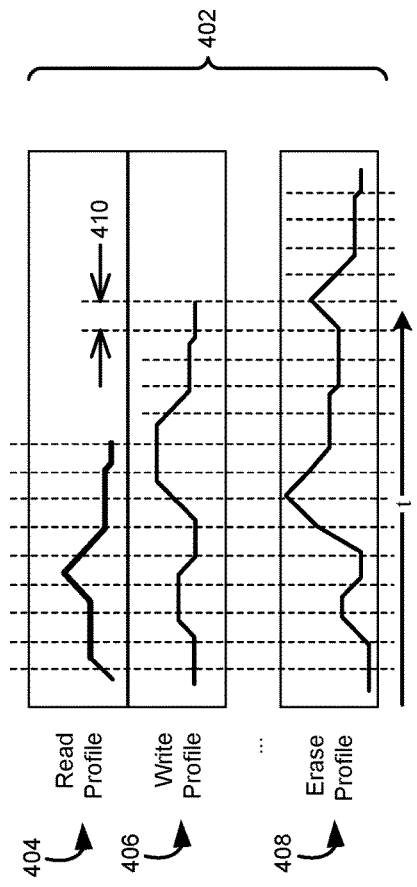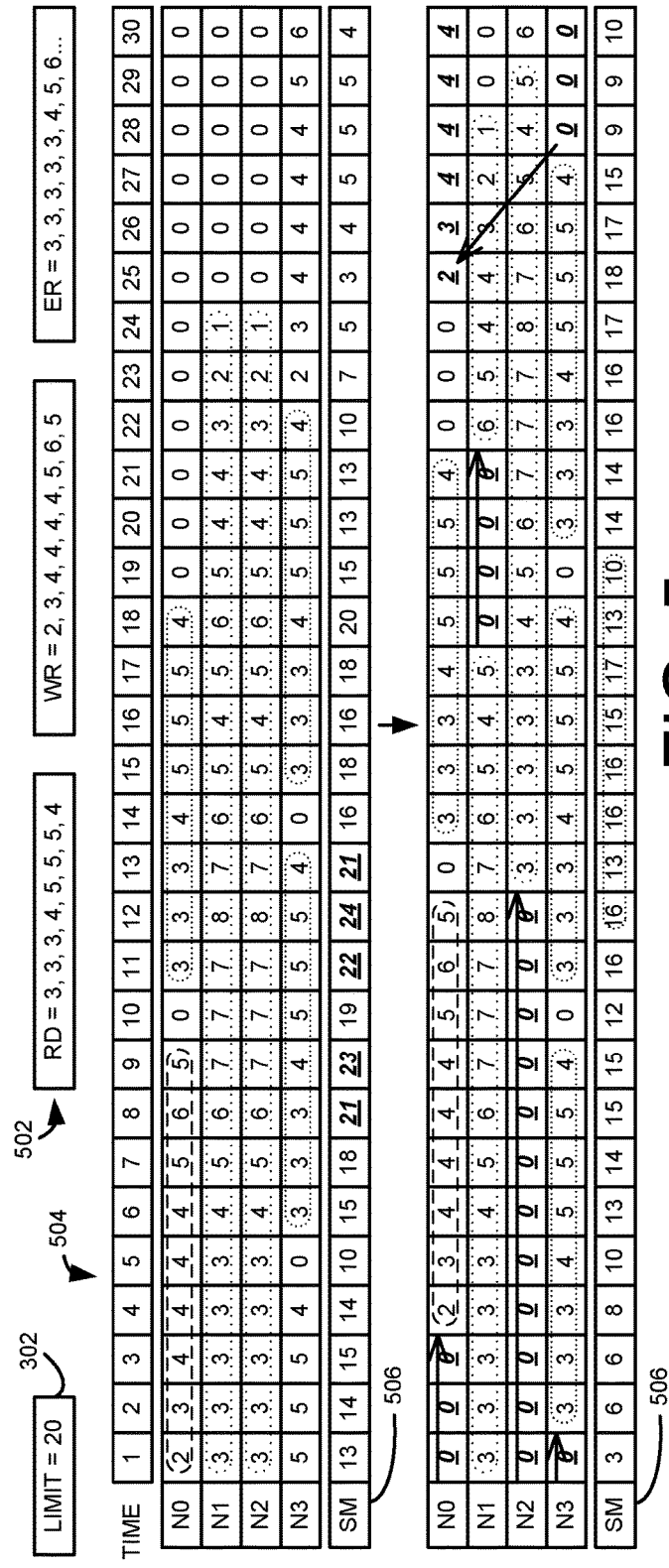

MEMORY DEVICE WITH POWER MANAGEMENT

TECHNICAL FIELD

The disclosed embodiments relate to memory devices, and, in particular, to memory devices with a mechanism for managing power consumption.

BACKGROUND

Computing systems can employ memory devices (e.g., volatile memory devices, non-volatile memory devices, such as flash memory, or a combination device) to store and access information. The memory devices can utilize electrical charges, along with corresponding threshold levels or processing voltage levels, to store and access data.

In storing and accessing the data, memory devices draw electrical current and consume corresponding amounts of electrical power. The instantaneous levels of power consumption are often inconstant throughout the execution of memory operations, and can include transient load spikes at certain stages or moments during a memory operation. Since memory devices can often perform multiple simultaneous operations, the transient load peaks can be problematic in light of the combined power consumption and physical limitations of the memory devices. While attempts have been made to improve the power management in memory devices, various challenges (e.g., numerous possible combinations and timing of simultaneous operations, different design considerations, unique component characteristics, etc.) have made it difficult to manage the power consumption in real-time. Thus, there is a need for a memory device with a power management mechanism.

BRIEF DESCRIPTION OF THE DRAWINGS

FIG. 4 conceptually illustrates load profiles of the data transactions in accordance with an embodiment of the present technology.

FIG. 5 illustrates a change in the total power consumption associated with rescheduling transactions in accordance with an embodiment of the present technology.

DETAILED DESCRIPTION

Figure 1:
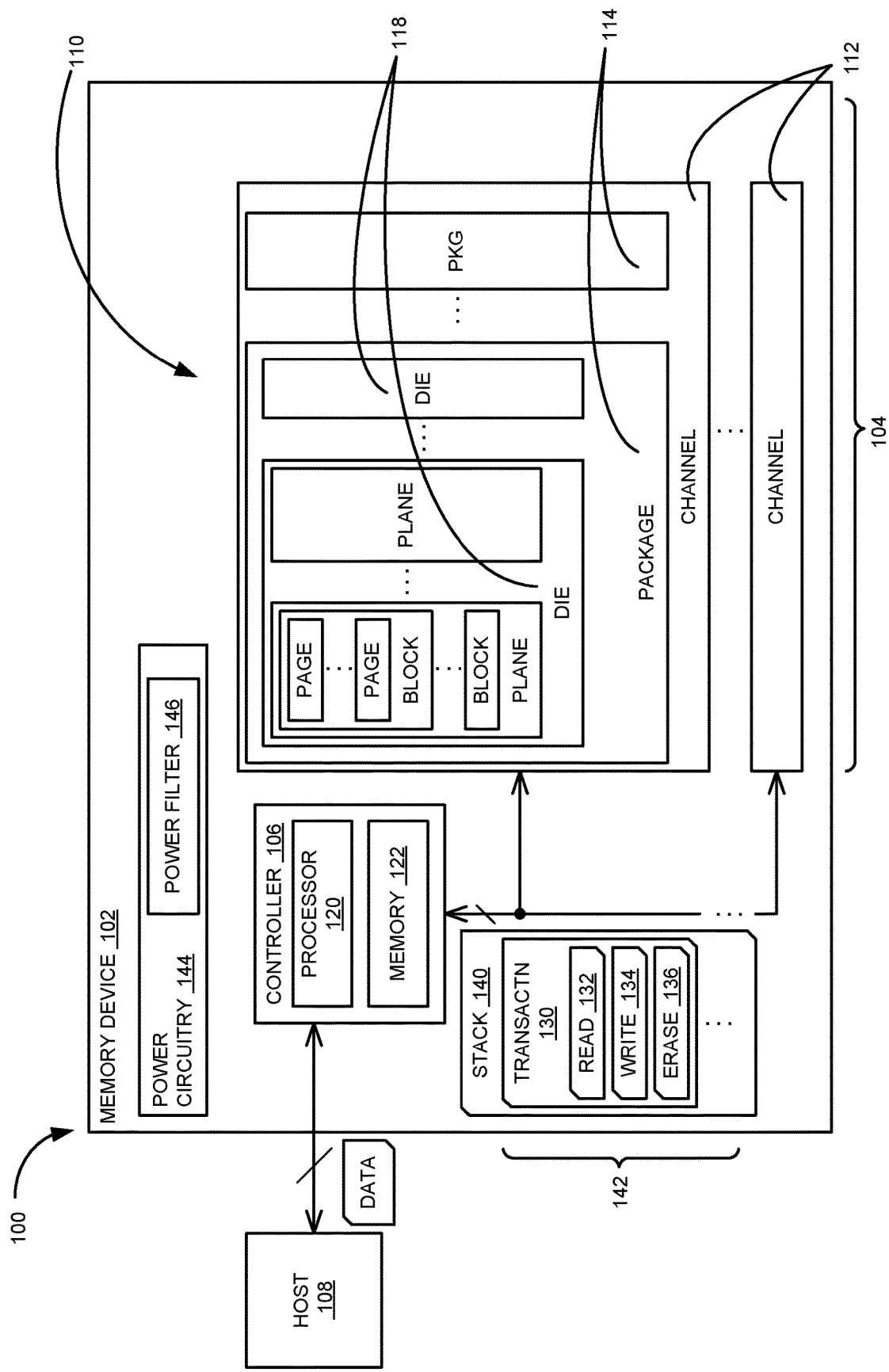
FIG. 1 is a block diagram of a memory system with a power management mechanism in accordance with an embodiment of the present technology.

The technology disclosed herein relates to memory devices, systems with memory devices, and related methods for scheduling transactions (e.g., read operations, write operations, erase operations) at the memory device based on power consumption characteristics of the transactions. In implementing each of the transactions, the memory device considers the varying levels of instantaneous current/power consumed by the memory component (e.g., a NAND die) executing the transactions. By considering the instantaneous current/power drawn throughout execution of the transactions, the memory device can also account for transient loads, where the memory component consumes a peak (i.e., local or overall maximum) level or amount of power that lasts for a relatively short duration (e.g., less than 10%) in comparison to a total amount of time necessary to complete the transaction.

Since the peak power levels are momentary, designing the hardware of the memory device to handle the highest possible level of power consumption, which would generally occur only rarely, can lead to overall inefficiency. Such inefficiency is worsened when the memory device is capable of concurrently executing multiple transactions using multiple memory components.

In considering the instantaneous current/power consumed throughout execution of the transactions, the memory devices (e.g., using controllers therein or coupled thereto) can schedule the transactions to ensure that the total current consumption at any given moment stays below a threshold level to reduce the inefficiency described above. Accordingly, the memory device can arrange the set of transactions differently than an initial schedule for executing the transactions (e.g., rather than according to a sequence in which the transactions were received from a host device, or a regular timing for implementing internal operations, etc.). For example, the memory devices can delay execution of a transaction, alter the execution sequence for the transactions, assigning a different memory component to execute the transaction, suspending one or more transactions, or a combination thereof.

In accordance with an embodiment of the present technology, memory devices can use load profiles (e.g., a set or a sequence of values that represent the amount of power instantaneously consumed during execution of corresponding transactions) to calculate the total amount of power consumption for a given implementation arrangement of the transactions. For example, the memory devices can include a table representing power consumption levels for each memory component across regularly spaced time intervals. The table can represent each of the NAND components along one dimension (e.g., along a vertical direction) and regularly spaced time intervals for each of the components along another dimension (e.g., along a horizontal direction). According to the arrangement specified by a particular schedule, the memory devices can fill the table with values of the load profiles for the scheduled transactions. As such, the memory devices can characterize the power that will be consumed each moment by each component executing the transactions according to the particular schedule. To find the corresponding total power consumption for each time interval of the table, the memory devices can sum the values in the table across the NAND components for each moment. Using the resulting sums, the memory devices can adjust the scheduling arrangement and/or evaluate various different scheduling arrangements to calculate an updated sequence that maintains the total power consumption within or below a threshold across the time intervals.

FIG. 1 is a block diagram of a memory system 100 with a power management mechanism in accordance with an embodiment of the present technology. The memory system 100 includes a memory device 102 having a memory array 104 (e.g., NAND flash) and a controller 106. The memory device 102 can operably couple the memory array 104 to a host device 108 (e.g., an upstream central processor (CPU)).

The memory array 104 can include circuitry configured to store data and to provide access to data. The memory array 104 can be provided as semiconductor, integrated circuits, and/or external removable devices in computers or other electronic devices. The memory array 104 includes a plurality of memory components 110 (e.g., channels 112, packages 114, dies 118, planes, blocks, pages, cells, etc.) configured to store and provide access to data. For example, the memory array 104 can include an array of memory cells that each store data in a charge storage structure. The memory cells can include, for example, floating gate, charge trap, phase change, ferroelectric, magnetoresistive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state.

The memory cells can be arranged in rows (e.g., each corresponding to a word line) and columns (e.g., each corresponding to a bit line). Each word line can include one or more memory pages, depending upon the number of data states the memory cells of that word line are configured to store. Each column can include a string of series-coupled memory cells coupled to a common source. The memory cells of each string can be connected in series between a source select transistor (e.g., a field-effect transistor) and a drain select transistor (e.g., a field-effect transistor). Source select transistors can be commonly coupled to a source select line, and drain select transistors can be commonly coupled to a drain select line.

The memory pages can be grouped into memory blocks. In operation, the data can be written or otherwise programmed (e.g., erased) with regards to the various memory regions of the memory device 102, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

In manipulating the data (e.g., for writing, reading, or erasing the data), the controller 106 can utilize the channels 112, where each channel corresponds to a grouping of the packages 114. Each package can further include one or more integrated circuit dies 118 (i.e., a semiconducting structure having the functional circuits therein). The memory cells can be part of the functional circuits within the dies 118, and can be formed along planes within the dies 118.

For example, the package 114 can each include a stack of memory dies 118 vertically connected with through-silicon vias (TSVs). Also for example, the semiconductor die can be arranged with other dies in a single device package 114. The memory dies 118 can also include other circuit components (not shown), such as multiplexers, decoders, buffers, read/write drivers, address registers, data out/data in registers, etc., for accessing and/or programming (e.g., writing) the data and other functionality, such as for processing information and/or communicating with the controller 106. In other embodiments, the memory cells can be arranged in different types of groups and/or hierarchies than those shown in the illustrated embodiments.

The controller 106 can be a microcontroller, special purpose logic circuitry (e.g., a field programmable gate array (FPGA), an application specific integrated circuit (ASIC), etc.), or other suitable processor. The controller 106 can include a processor 120 configured to execute instructions stored in memory. In the illustrated example, the memory of the controller 106 includes an embedded memory 122 configured to store instructions for performing various processes, operations, logic flows, and routines that control operation of the memory system 100, including managing the memory device 102 and handling communications between the memory device 102 and the host device 108. In some embodiments, the embedded memory 122 can include memory registers storing, e.g., memory pointers, fetched data, etc. The embedded memory 122 can also include read-only memory (ROM) for storing micro-code. While the example memory device 102 in FIG. 1 has been illustrated as including the controller 106, in another embodiment of the present technology, a memory device may not include a controller, and may instead rely upon external control (e.g., provided by an external host, or by a processor or controller separate from the memory device).

In some scenarios or embodiments, the host device 108 can command or request transactions 130 of various types (e.g., read operations 132, write operations 134, or erase operations 136) for storing, accessing, or managing the data with respect to the memory device 102 or a specific NAND component therein. The controller 106 can implement the transactions 130 with respect to the memory array 104 or the specific NAND component. In some scenarios or embodiments, the controller 106 can initiate the transactions 130 without any initiating input or command from the host device 108 (e.g., for housekeeping operations, such as garbage collection or data refresh).

The controller 106 can store a set of the transactions 130 in an operation stack 140 until they are executed. The controller 106 can store the transactions 130 according to an initial schedule 142. The initial schedule 142 can correspond to a sequence, a NAND device assignment, or a combination thereof in which the transactions 130 were received from the host device 108. The initial schedule 142 can further correspond to a sequence or timing for the internally initiated transactions 130 (i.e., by the controller 106 and without any initiating input from the host device 108), such as for regularly timed operations (e.g., data refresh or reallocate) or conditionally triggered operations (e.g., garbage collection).

Instead of executing the transactions 130 according to the initial schedule 142, the controller 106 can adjust the execution arrangement of the transactions 130 according to power consumptions parameters. In doing so, the controller 106 can monitor and control the power consumption in addition to and/or separate from power circuitry 144 (e.g., power supply, regulator, interface, etc.) configured to provide electrical power to the components within the memory array 104. The power circuitry 144 can further include a power filter 146 (e.g., circuitry such as including capacitors, or filters) configured to control or regulate power levels or a rate of change in the power levels. In some embodiments, the host device 108 can analyze the power consumption according to power, independent of or in conjunction with the controller 106.

Figure 2:
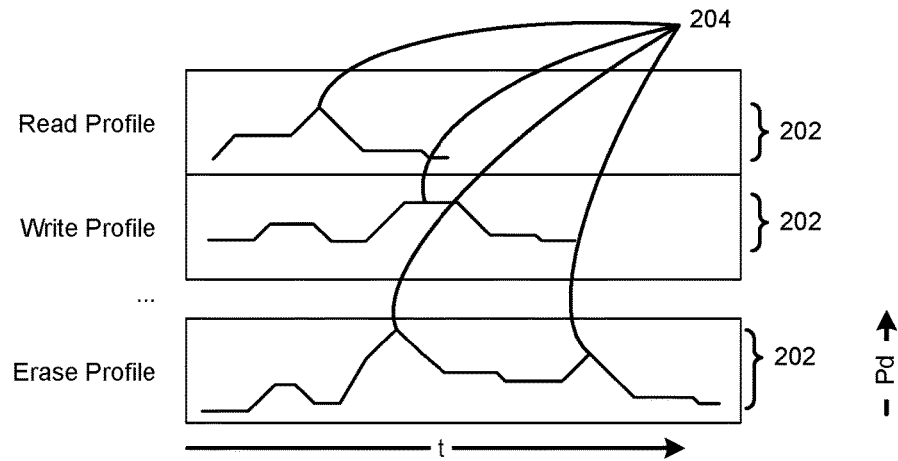
FIG. 2 illustrates examples of power consumption levels associated with data transactions in accordance with an embodiment of the present technology.

FIG. 2 illustrates examples of power consumption levels 202 associated with implementing data transactions in accordance with an embodiment of the present technology. The memory system 100 of FIG. 1 can measure, record, and utilize the power consumption levels 202 of various transactions, such as the read operation 132 of FIG. 1, the write operation 134 of FIG. 1, the erase operation 136 of FIG. 1, etc. For illustrative purposes, an instantaneous magnitude or amount of consumption is represented along a vertical direction and time is represented along a horizontal direction.

The power consumption levels 202 can include one or more transient load spikes 204. The transient load spikes 204 can include relatively high (i.e., levels or rates of change that exceed the surrounding levels (e.g., for local or overall maximum) or thresholds) levels of current or power consumptions during execution of the corresponding transactions. The transient load spikes 204 can further last for a relatively short duration during the execution of the operation (e.g., less than 50% or 20% of the total duration for executing the transactions).

Figure 3:
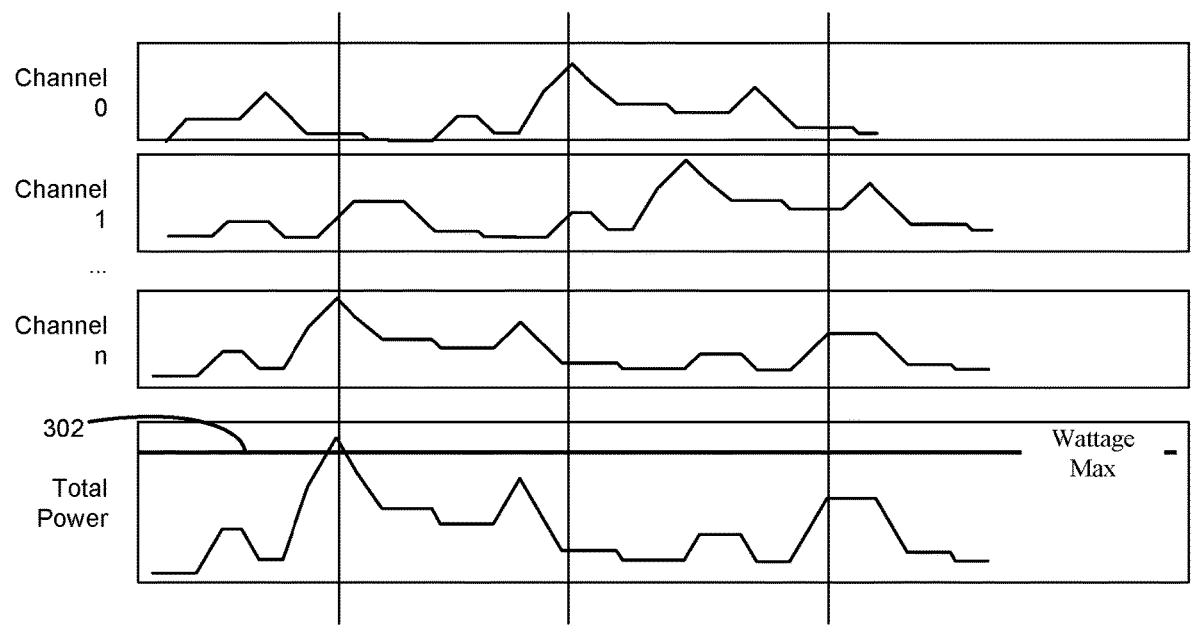
FIG. 3 illustrates an example of a total power consumption in accordance with an embodiment of the present technology.

FIG. 3 illustrates an example of a total power consumption in accordance with an embodiment of the present technology. The memory device 102 of FIG. 1 can calculate the total power consumption corresponding to one or more levels of the memory components 110 of FIG. 1. As an illustrative example, the total power consumption is shown in FIG. 3 as corresponding to the memory device 102 overall (i.e., sum of power levels consumed by the channels within the memory device 102). For example, the memory device 102 can simultaneously execute multiple transactions 130 across multiple channels. Each of the executions can consume power as illustrated in FIG. 2, resulting in the power consumption trace or envelop for the corresponding channel. The total power consumed by the memory device 102 can be the sum of the power consumed by each of the components (e.g., channels). In some embodiments, the total power consumption can be calculated for each channel, package, chip, die, etc.

In executing the transactions 130 according to the initial schedule 142 (i.e., without adjusting for power consumption), the memory device 102 may risk consuming more power or current than a consumption threshold 302. The consumption threshold 302 can correspond to a limit or a constraint on a level of power/current consumption (i.e., power rating or limitation corresponding to hardware components and/or configurations). Exceeding the consumption threshold 302 can cause a power supply to brown-out, potentially taking the memory device 102 offline, causing data loss therein or causing damage thereto.

FIG. 4 conceptually illustrates load profiles 402 of the data transactions in accordance with an embodiment of the present technology. The load profile 402 can include representation of the consumption levels 202 of FIG. 2 for the transactions 130 of FIG. 1. In some embodiments, the memory system 100 of FIG. 1 can generate the load profiles 402 by measuring and/or sampling the consumption levels 202 of the memory components 110 of FIG. 1 or a component/circuitry representative of the memory components 110 while implementing or executing the transactions 130 (e.g., the read operation 132 of FIG. 1, the write operation 134 of FIG. 1, the erase operation 136 of FIG. 1, etc.) thereon.

For example, the memory system 100 can generate a read profile 404 by sampling the consumption levels 202 while executing the read operation 132 using a memory die that is configured as part of the memory device 102 or that is representative of the memory dies 118 of FIG. 1 within the memory device 102. The memory system 100 can similarly generate a write profile 406 by sampling while executing the write operation 134 and an erase profile 408 while executing the erase operation 136. In some embodiments, the load profiles 402 can include a set of values corresponding to the consumption level measured according to a time interval 410 that corresponds to a sampling frequency. In some embodiments, the memory system 100 can utilize multiple sets of load profiles 402 that correspond to different sampling frequencies.

The memory system 100 can store the generated load profiles 402 in the memory device 102. The memory system 100 can use the load profiles 402 to characterize the power consumption of other memory components in the memory device 102. For example, the load profiles 402 can represent the power that can be consumed by other memory dies 118 of the memory device 102 executing the read operation 132, the write operation 134, the erase operation 136, etc.

The memory device 102 (e.g., using the controller 106 of FIG. 1) can use the load profiles 402 to calculate or estimate the moment-by-moment total power consumption associated with implementing the transactions 130 according to a specific sequence or arrangement. Using the load profiles 402, the memory device 102 can adjust or discard the initial schedule 142, and execute the transactions 130 in the operation stack 140 of FIG. 1 in a different sequence or arrangement that maintains the total power consumption below the consumption threshold 302.

FIG. 5 illustrates a change in the total power consumption associated with rescheduling the transactions 130 in accordance with an embodiment of the present technology. The memory device 102 of FIG. 1 can use consumption sample values 502 (e.g., sampled values representing power or current consumption levels associated with executing the transactions 130 of FIG. 1) of the load profiles 402 of FIG. 4 to determine a consumption estimate profile 504 (e.g., moment-by-moment description of power/current that will be consumed over time by executing the transactions 130 according to a particular arrangement).

For example, the consumption estimate profile 504 can be implemented using the tables illustrated in FIG. 5. Each row in the consumption estimate profile 504 can correspond to one of the memory components 110 of FIG. 1 (e.g., the memory dies 118 of FIG. 1), and each column can correspond to a particular time interval 410 of FIG. 4 (e.g., corresponding to the sampling frequency). The consumption estimate profile 504 can include a number of time slots corresponding to future or upcoming times and operations. The controller 106 can calculate the consumption estimate profile 504 by filling the table with the consumption sample values 502 of the transactions 130 according to a particular schedule, such as the initial schedule 142. As illustrated in FIG. 5, the initial schedule 142 is represented in the top table with: 'NAND0' having the write operation 134 scheduled at time '1' and the read operation 132 scheduled at time '11,' 'NAND1' and 'NAND2' both having the erase operation 136 scheduled at time '1,' and 'NAND3' having the read operation 132 finish at time '4' and further reads scheduled for time '6' and '15' followed by the write operation 134 at time '23.'

The controller 106 can use the consumption estimate profile 504 to calculate a combined consumption estimate 506 representing the total consumption level. For example, the controller 106 can calculate the combined consumption estimate 506 by calculating a sum of the consumption sample values 502 across the NAND components for each time slot.

The controller 106 can use the combined consumption estimate 506 to evaluate the corresponding schedule. The controller 106 can adjust the corresponding schedule or generate a new schedule for the transactions 130 in the operation stack 140 when the evaluated schedule consumes power exceeding the consumption threshold 302. For example, the initial schedule 142 can correspond to excessive power consumption at time slots '8' through '9' and '11' through '13.' In response, the controller 106 can calculate an updated schedule 508 (i.e., an arrangement and/or sequence for executing the transactions 130 different than the initial schedule) that maintains the combined consumption estimate 506 below the consumption threshold 302.

The controller 106 can calculate the updated schedule 508 using one or more scheduling mechanisms (i.e., an algorithm, a software routine, a method, a circuitry, a configuration, or a combination thereof). In some embodiments, the controller 106 can calculate the updated schedule 508 using a delay mechanism that reschedules the corresponding transaction at a time later than the previous schedule (e.g., delaying the write operation from time '1' to time '4' for 'NAND0' and delaying the erase operation from time '1' to time '13' for 'NAND2' as illustrated in FIG. 5). In some embodiments, the controller 106 can calculate the updated schedule 508 using a suspend-operation mechanism that pauses or suspends execution of the corresponding transaction (e.g., suspending the erase operation at time '18' through '21' and resume the remaining portion of the transaction at time '22' as illustrated in FIG. 5). In some embodiments, the controller 106 can calculate the updated schedule 508 using a component-reallocation mechanism that reschedules the transaction to a different component (i.e., a different channel, package, chip, die, etc., such as rescheduling a write operation from 'NAND3' to 'NAND0' as illustrated in FIG. 5).

The controller 106 can calculate the updated schedule 508 according to a preference or a weighing scheme (e.g., for determining which transaction to reschedule). For example, the controller 106 can determine a transaction to be rescheduled based on transaction types, incoming or received sequence, etc. In some embodiments, the controller 106 can calculate the updated schedule 508 based on rescheduling (e.g., delaying or suspending transactions) the erase operation 136 and/or the write operation 134 before rescheduling the read operation 132. In some embodiments, the controller 106 can calculate the updated schedule 508 based on reallocating the write operation 134. In some embodiments, the controller 106 can reschedule based on the transaction type and then based on the received order.

Figure 6:
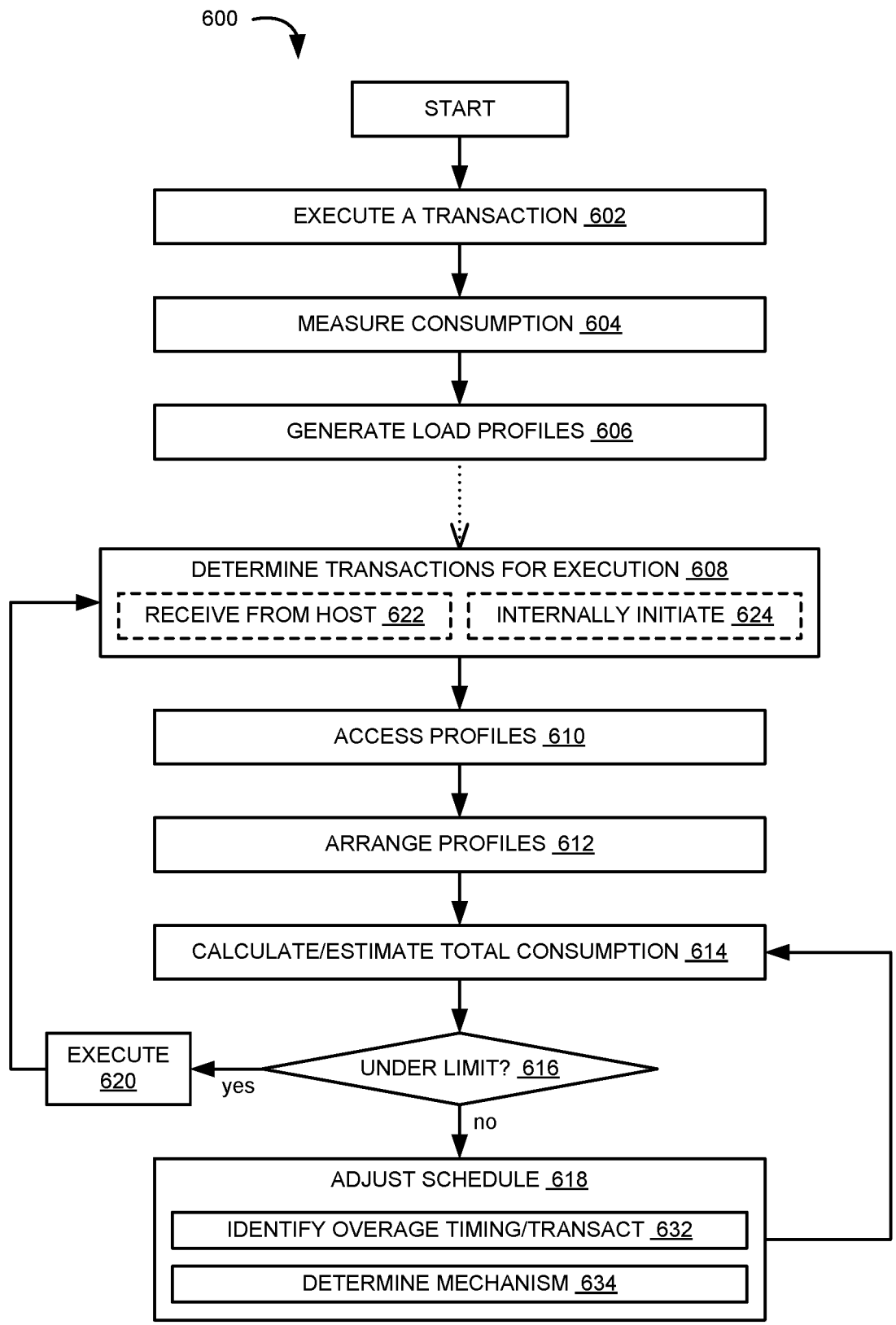
FIG. 6 illustrates an example method of operating a memory system in accordance with embodiments of the present technology.

FIG. 6 illustrates an example method 600 of operating the memory system 100 in FIG. 1 in accordance with embodiments of the present technology. The memory system 100 can use the method 600 to generate the load profiles 402 of FIG. 4 that can be subsequently used to adjust the execution schedule of the transactions 130 of FIG. 1 according to the total power consumption level.

At a box 602, the memory system 100 can execute a transaction (e.g., the read operation 132 of FIG. 1, the write operation 134 of FIG. 1, or the erase operation 136 of FIG. 1). The memory system 100 can use a memory component representative of the memory components 110 of FIG. 1 (e.g., the memory channels 112 of FIG. 1, the memory packages 114 of FIG. 1, the memory dies 118 of FIG. 1, etc.) in the memory device 102 of FIG. 1. For example, the memory system 100 can execute the transaction using the memory array 104 of FIG. 1 and the power circuitry 144 of FIG. 1, a representative circuit, etc.

At a box 604, the power or current consumption associated with executing the transaction can be measured. The measurement can be done with the power circuitry 144 of the memory system 100, or with other measurement circuitry (e.g., current-reading resistor, lab equipment, etc.) to determine the consumption levels 202 of FIG. 2, the consumption sample values 502 of FIG. 5 (i.e., measurements sampled at time intervals 410 of FIG. 4 corresponding to the sampling frequency), or a combination thereof. The measurement can represent the current draw or the power consumption that will take place when the memory device 102 executes the transaction.

At a box 606, the memory system 100 can generate the load profiles 402. The memory system 100 can repeat the processes represented in boxes 602-604 for all possible transactions or variations thereof. The memory system 100 can store the load profiles 402 in the memory device 102, such as in the memory array 104 or the embedded memory 122 of FIG. 1.

The memory system 100 can further use the method 600 to adjust the execution schedule of the transactions 130 of FIG. 1 and maintain the total power consumption level below the consumption threshold 302 of FIG. 3. For example, the memory device 102 (e.g., self-initiated and executed by the controller 106 without any influence or initiation from the host device 108) can adjust the execution schedule using the load profiles 402.

At a box 608, the memory device 102 can determine the transactions 130 intended for execution therein. The memory device 102 can determine the transactions 130 by receiving the transactions 130 from the host device 108, as represented in a box 622. The memory device 102 can further determine the transactions 130 by internally initiating the transactions 130 (e.g., as part of a garbage collection process or a data refresh process), as represented in a box 624. The memory device 102 can store and/or track the transactions 130 using the operation stack 140. Initially, the memory device 102 can store the received and/or the self-initiated transactions as they are received or triggered (i.e., according to the initial schedule 142).

At a box 610, the memory device 102 can access the load profiles 402 that correspond to the transactions 130 in the operation stack 140. The memory device 102 can access the load profiles 402 stored in the memory device 102.

For illustrative purposes, the memory device 102 is described as accessing the load profiles 402 that are predetermined, as discussed above. However, it is understood that the memory device 102 can operate differently, such as by dynamically measuring and updating the load profiles 402.

At a box 612, the memory device 102 can arrange the load profiles 402 (i.e., the consumption sample values 502 therein) according to the schedule. For example, the controller 106 can fill the consumption estimate profile 504 of FIG. 5 according to the schedule, such as by filling the corresponding time slots with the consumption sample values 502 according to the processed schedule (e.g., the initial schedule 142 or the adjusted arrangement).

The controller 106 can further update the consumption estimate profile 504 according to execution and passage of time. For example, the controller 106 can shift the consumption sample values 502 to a lower or sooner time slot (e.g., to the left as illustrated in FIG. 5) for each execution or time cycle (e.g., a fixed time duration or a system trigger). The current time can be time '0' (not shown in FIG. 5) and the time slots can be the upcoming time periods or intervals.

At a box 614, the memory device 102 can calculate or estimate the total consumption associated with the processed schedule. For example, the controller 106 can calculate or estimate the total for future or upcoming time slots by calculating the combined consumption estimate 506 (i.e., by summing the consumption sample values 502 across the memory components 110 for the upcoming or future time slots). As illustrated in FIG. 5, the controller 106 can calculate the combined consumption estimate 506 by summing the values in each column corresponding to the time slot.

At a box 616, the memory device 102 can determine if the combined consumption estimate 506 of the processed schedule exceeds the consumption threshold 302 at any upcoming time slots or future times. The memory device 102 can compare the value of the combined consumption estimate 506 for each upcoming time slots with the consumption threshold 302.

At a box 620, the memory device 102 can execute the transactions 130 according to the processed sequence (e.g., the initial schedule 142 or the schedule that has been updated) when the combined consumption estimate 506 is below the consumption threshold 302 for the upcoming time slots. The method 600 can feedback to the box 608 and further process new transactions.

At a box 618, the memory device 102 can adjust the processed schedule and/or generate the updated schedule 508, which is different from the processed schedule, for executing the transactions 130 in the operation stack 140 when the combined consumption estimate 506 is equal to or greater than the consumption threshold 302 for the upcoming time slots. For example, the controller 106 can delay execution of a transaction, suspend an ongoing transaction in the midst of execution, restart or complete the remaining part of the suspended transaction, reallocate the transaction for execution using a different memory component, or a combination thereof.

At a box 632, the controller 106 can adjust or generate based on identifying a timing or a time slot where the combined consumption estimate 506 exceeds the consumption threshold 302. The controller 106 can further identify the particular transaction associated with the time slot or the timing with the exceeding power consumption. The controller 106 can further identify the transient load spikes 204 of FIG. 2 associated with the scheduled transactions.

At a box 634, the controller 106 can determine a mechanism for adjusting the schedule and/or generating the updated schedule 508. For example, the controller 106 can delay execution, suspend or restart, reallocate, or a combination thereof for one or more of the transactions associated with exceeding power consumption at an upcoming time. Also for example, the controller 106 can delay execution, suspend or restart, reallocate, or a combination thereof for one or more of the transactions scheduled before or after the time slot corresponding to the exceeding power consumption. Also for example, the controller 106 can follow an order of operation or importance in generating the updated schedule 508, such as by rescheduling the write operation 134 and/or the erase operation 136 before the read operation 132 and then implementing the most recent operation first.

The updated schedule 508 can be fed back to the box 614 and evaluated as discussed above. For example, the controller 106 can generate the consumption estimate profile 504, calculate and evaluate the combined consumption estimate 506, and compare the combined consumption estimate 506 against the consumption threshold 302.

In some embodiments, the controller 106 can generate the updated schedule 508 based on generating a set number of possible schedules. The controller 106 can evaluate the multiple possible schedules, such as by calculating a score for each schedule based on a number of changes to the schedule, an overall delay to the set of the transactions 130, a maximum or a sustained power consumption, etc. The controller 106 can select one of the evaluated schedules based on the score (e.g., the schedule with the lowest or the highest score).

Calculating the updated schedule 508 based on the consumption estimate profile 504 that estimates or predicts the total power consumption provides enhanced efficiency and robustness for the memory device 102. The controller 106 can automatically use the updated schedule 508 to keep the total power consumption level below a maximum, which can lead to a reduction in unnecessary power capacity (e.g. thereby logically increasing the performance within the alotted power budget), and also prevent any brown-outs for power supplies.

Figure 7:
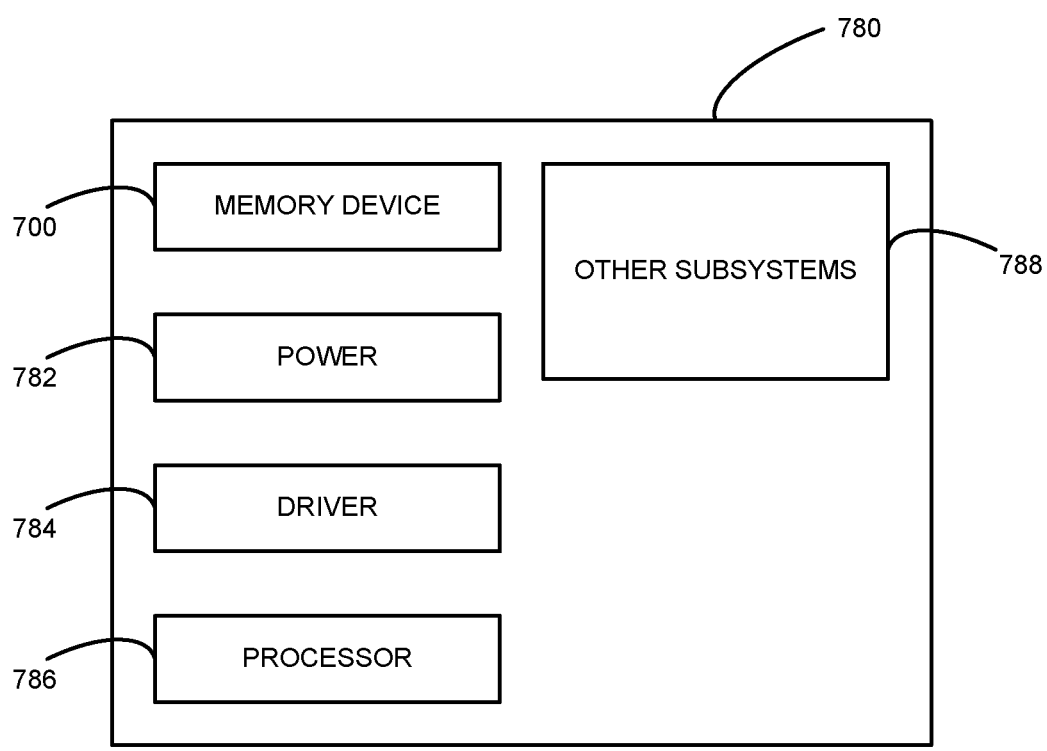
FIG. 7 is a schematic view of a system that includes a memory device in accordance with embodiments of the present technology.

FIG. 7 is a schematic view of a system that includes a memory device in accordance with embodiments of the present technology. Any one of the foregoing memory devices described above with reference to FIGS. 1-6 can be incorporated into any of a myriad of larger and/or more complex systems, a representative example of which is system 780 shown schematically in FIG. 7. The system 780 can include a memory device 700, a power source 782, a driver 784, a processor 786, and/or other subsystems or components 788. The memory device 700 can include features generally similar to those of the memory device described above with reference to FIGS. 1-6, and can therefore include various features for performing the operations discussed above. The resulting system 780 can perform any of a wide variety of functions, such as memory storage, data processing, and/or other suitable functions. Accordingly, representative systems 780 can include, without limitation, hand-held devices (e.g., mobile phones, tablets, digital readers, and digital audio players), computers, vehicles, appliances and other products. Components of the system 780 may be housed in a single unit or distributed over multiple, interconnected units (e.g., through a communications network). The components of the system 780 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

We claim:
1. A memory device, comprising:
a memory array including a plurality of memory components; and
a memory controller coupled to the memory array, the controller configured to:
determine a set of transactions to be implemented across two or more memory components according to an initial schedule, wherein the transactions are associated with transient load spikes that each correspond to a local or an overall maximum load level lasting for less than a threshold duration for a corresponding transaction in the set of transactions;

identify two or more load profiles that correspond to the set of transactions, the two or more load profiles each representing a sequence of power consumption levels that correspond to a sampling frequency, wherein subsets of values in the two or more load profiles correspond to the transient load spikes;

calculate a first plurality of power consumption levels corresponding to the initial schedule based on summing values in the identified load profiles across the two or more memory components, wherein the first plurality of power consumption levels includes summed values corresponding to the transient load spikes; and when one or more levels in the first plurality of power consumption levels exceed a predetermined threshold, calculate an updated schedule based on (1) dynamically shifting one or more of the identified load profiles to an upcoming instance of time slots, wherein the time slots correspond to the sampling frequency, and (2) evaluating a sum of power consumption level sequences for the identified load profiles within the upcoming instance of the time slots, the updated schedule for implementing the set of transactions across the two or more memory components, wherein:

the one or more levels in the first plurality of power consumption levels that exceed the predetermined threshold corresponds to a time when one or more of the transient load spikes are scheduled to occur according to the initial schedule, and the updated schedule corresponds to a second plurality of power consumption levels that are all at or below the predetermined threshold.

2. The memory device of claim 1 wherein the load profiles each include a sequence sampled power values representative of different power consumption levels, including the transient load spikes, sampled at the sampling frequency during a previous execution of a representative transaction of a same type.

3. The memory device of claim 2 wherein the memory controller is configured to:

calculate the first plurality of power consumption levels based on calculating a combined consumption by adding the sampled values of the load profiles corresponding to transactions in the initial schedule; and calculate the updated schedule based on determining that one or more levels in the first plurality of power consumption levels exceed the predetermined threshold by comparing the combined consumption at upcoming time slots to the predetermined threshold.

4. The memory device of claim 1 wherein the memory controller is configured to:

receive the set of transactions or a portion thereof from a host device, wherein the set of transactions or the portion thereof are received according to an incoming sequence; and calculate the updated schedule different than the incoming sequence.

5. The memory device of claim 4 wherein the memory controller is configured to:

receive the set of transactions including a first transaction received before a second transaction; and calculate the updated schedule for implementing the second transaction before the first transaction based on upcoming power utilization needs.

6. The memory device of claim 4 wherein the memory controller is configured to:

receive the set of transactions including a transaction designated for implementation with a memory component; and calculate the updated schedule including implementing the transaction with a different memory component.

7. The memory device of claim 4 wherein the memory controller is configured to:

receive the set of transactions including a transaction; and calculate the updated schedule including a first timing, a second timing, and a third timing, the first timing for initiating the transaction, the second timing for suspending the transaction after initiation, and the third timing for resuming the transaction after suspension.

8. The memory device of claim 1 wherein the memory controller is configured to calculate the updated schedule according to transaction types.

9. The memory device of claim 8 wherein the memory controller is configured to delay or suspend a write operation or an erase operation before adjusting a timing for a read operation.

10. The memory device of claim 1 wherein the load profiles each corresponds to a set of measurements taken during g execution of a corresponding transaction type implemented on one memory component for the memory device, wherein each of the load profiles is for representing subsequent executions for the corresponding transaction type implemented on the memory components within the memory device.

11. The memory device of claim 1 wherein the controller is configured to reschedule the set of transactions within an operation stack.

12. The memory device of claim 1 wherein the memory components are NAND dies.

13. The memory device of claim 1 further comprising:

a power circuitry, coupled to the controller, configured to provide filtered power to the memory array and the controller; and wherein:

the load profiles each represent the sequence of power consumption level corresponding to the filtered power.

14. The memory device of claim 1 wherein the updated schedule includes concurrent implementation of two or more transactions.

15. A method of operating a memory device including a controller and a memory array including memory components, the method comprising:

determining a set of transactions to be implemented across two or more memory components according to an initial schedule, wherein the transactions are associated with transient load spikes that each correspond to a local or an overall maximum load level lasting for less than a threshold duration for a corresponding transaction in the set of transactions;

identifying two or more load profiles that correspond to the set of transactions, the two or more load profiles each representing a sequence of power consumption levels that correspond to a sampling frequency, wherein subsets of values in the two or more load profiles correspond to the transient load spikes;

estimating a first plurality of power consumption levels corresponding to the initial schedule based on summing power consumption levels of the identified load profiles across the two or more memory components, wherein the first plurality of power consumption levels includes summed values corresponding to the transient load spikes of the set of transactions; and when one or more levels in the first plurality of power consumption levels exceed a predetermined threshold, calculating an updated schedule based on (1) dynamically shifting one or more of the identified load profiles to an upcoming instance of time slots, wherein the time slots correspond to the sampling frequency, and (2) evaluating a sum of power consumption level sequences for the identified load profiles within the upcoming instance of the time slots, the updated schedule for implementing the set of transactions across the two or more memory components, wherein:
the one or more levels in the first plurality of power consumption levels that exceed the predetermined threshold corresponds to a time when one or more of the transient load spikes are scheduled to occur according to the initial schedule, and
the updated schedule corresponds to a second plurality of power consumption levels that are all at or below the predetermined threshold.

16. The method of claim 15, wherein the load profiles each include a sequence of sampled power values, including the transient load spikes, representing the sequence of power consumption level sampled at a sampling frequency during previous execution of the corresponding transaction.

17. The method of claim 16, wherein:
estimating the first plurality of power consumption levels includes calculating a combined consumption by adding the sampled values of the load profiles corresponding to transactions in the initial schedule; and
calculating the updated schedule includes determining that one or more levels in the first plurality of power consumption levels exceed the predetermined threshold based on comparing the combined consumption at upcoming time slots to the predetermined threshold.

18. The method of claim 15, further comprising:
receiving the set of transactions or a portion thereof from a host device, wherein the set of transactions or the portion thereof are received according to an incoming sequence; and
wherein calculating the updated schedule includes calculating the updated schedule that is different than the incoming sequence.

19. The method of claim 15, wherein:
receiving the set of transactions or a portion thereof includes receiving a first transaction and a second transaction, wherein the first transaction is intended for implementation on a particular component before the second transaction according to the incoming sequence; and
wherein calculating the updated schedule includes calculating the updated schedule for implementing the second transaction before the first transaction, for implementing the first transaction on a different component, for suspending one of the transactions while implementing the other transaction, or a combination thereof based on upcoming power utilization needs.

20. The method of claim 15, further comprising:
executing a read operation, a write operation, or an erase operation;
dynamically measuring power consumption levels during execution of the read operation, the write operation, or the erase operation; and
generating a load profile for the executed one of the operations based on the measured power consumption levels, the sequence of power consumption levels.

21. The memory device of claim 1 wherein lengths of different load profiles are independent of each other and correspond to an execution duration of a corresponding type of transaction.

22. The memory device of claim 1 wherein dynamically shifting the two or more of the identified load profiles comprises shifting one or more portions thereof.

* * * * *